United States Patent [19]

Clasen

[11] Patent Number: 5,120,444
[45] Date of Patent: Jun. 9, 1992

[54] METHOD OF AND DEVICES FOR MANUFACTURING GLASS BODIES

[75] Inventor: Rolf Clasen, Aachen, Fed. Rep. of Germany

[73] Assignee: U.S. Philips Corp., New York, N.Y.

[21] Appl. No.: 669,146

[22] Filed: Mar. 13, 1991

[30] Foreign Application Priority Data

Mar. 14, 1990 [DE] Fed. Rep. of Germany ....... 4008108
Mar. 14, 1990 [DE] Fed. Rep. of Germany ....... 4008109

[51] Int. Cl.$^5$ .......................................... C03B 37/016
[52] U.S. Cl. .................................... 210/639; 210/490; 65/18.1
[58] Field of Search ............... 65/17, 18.1; 204/180.1, 204/182.4, 181.6; 210/651, 652, 639, 490, 500.26, 500.25; 427/245

[56] References Cited

U.S. PATENT DOCUMENTS 4,684,386 8/1987 Clasen ................................. 65/17 X
4,885,018 12/1989 Bachmann et al. ................. 65/3.11

Primary Examiner—Frank Spear
Attorney, Agent, or Firm—William L. Botjer

[57] ABSTRACT

Devices for and a method of manufacturing glass bodies, in which a porous green body is formed from the starting material for the glass body, being an aqueous suspension comprising a highly disperse solids content, which green body is then purified and sintered, and deposited by separating the phases of the suspension through electrophoresis, in such a manner that the solids content of the suspension is deposited on a porous deposition membrane having pores whose diameter is smaller than the average particle diameter of the solid particles present in the suspension, said membrane being arranged between the anode and the cathode, and the space between said membrane and the anode being filled with an electrically conducting liquid, a porous auxiliary membrane being arranged between and at a distance from the deposition membrane and the cathode, said auxiliary membrane having pores with a diameter which is smaller than the average particle diameter of the solid particles present in the suspension, and the space between the auxiliary membrane and the cathode being filled with an electrically conducting liquid and/or the electrodes bringing about the electrophoresis being arranged in such a manner with respect to the suspension that the direction of movement of the suspended particles and the gravitational field acting on the particles extend parallel to each other.

23 Claims, 1 Drawing Sheet

METHOD OF AND DEVICES FOR MANUFACTURING GLASS BODIES

BACKGROUND OF THE INVENTION

The invention relates to a method of manufacturing glass bodies, in which a porous green body is formed from the starting material for the glass body, which green body is then purified and sintered, the starting material being an aqueous suspension comprising a highly disperse solids content, and deposited by separating the phased of the suspension through electrophoresis, in such a manner that the solids content of the suspension is deposited on a porous deposition membrane having pores whose diameter is smaller than the average particle diameter of the solid particles present in the suspension, said membrane being arranged between the anode and the cathode, and the space between said membrane and the anode being filled with an electrically conducting liquid.

The invention furher relates to devices for carrying out the method in accordance with the invention.

The method described in the opening paragraph is particularly suitable for the manufacture of highly pure glass bodies. Highly pure silica-glass tubes are used, for example, as substrate tubes for the manufacture of optical waveguides by means of an internal coating process, in which tubes impurities in the form of subgroup elements and OH-groups are permissible to a degree of only a few ppb. For example, structured preforms for optical waveguides can be manufactured by combining very pure silica-glass rods with fluorine-doped cladding glasses.

Discs of highly pure silica glass are used as, for example, mask carriers in the semiconductor technology, a transmission of radiation in the ultraviolet range of the spectrum (180 nm) being required. For this reason, also this application of silica glass permits only a very low level of impurities, in particular in the form of metal ions.

German Patent Application DE 35 11 451, which corresponds to U.S. Pat. No. 4,684,386 describes a method of and a device for manufacturing glass bodies, which method and device enable a porous green body to be formed from the starting material for the glass body, being an aqueous suspension comprising a highly disperse solids content, which green body is subsequently purified and sintered, and deposited by separating the phases of the suspension through electrophoresis.

In the case of electrophoretic deposition from aqueous suspensions, local changes of the pH-value in the suspension take place as a result of the discharge of $H^+$-or OH-ions at the electrodes, which may lead to a change of the colloid-chemical system. An effect on the electrophoretic deposition can be observed, in particular, when due to long deposition times caused by low deposition rates or a large output of solid matter there is sufficient time to thoroughly mix the suspension in the deposition chamber, or when the electrolytes added to the suspension have only a small buffer effect due to their degree of dissociation or the concentration.

Changes in the effective pH-value during the electrophoretic deposition influence the density of the deposited moulded body, as a result of which geometrical changes or cracks may develop in subsequent processing steps (drying, sintering).

Further, it has been found that the density of the suspension decreases according as the rate of deposition of the dispersed particles increases. In the manufacture of very long tubes or in the case of perpendicularly arranged devices having a relatively large ratio of deposited material to dispersed particles, this may lead to separation problems. The concentrated suspension sediments and is covered by the depleted suspension. Since the electrophoretic deposition rate depends on the concentration of the particles in the suspension, the concentration gradient of the suspension may bring about a decrease in layer thickness from the bottom upwards.

SUMMARY OF THE INVENTION

It is an object of the invention to improve the method mentioned in the opening paragraph in such a manner that layers of a uniform thickness are deposited, and that in the electrophoretic deposition of green bodies from a suspension changes of the effective pH-value are counteracted.

This object is achieved by the method in accordance with the invention, in that a porous auxiliary membrane is arranged between and at a distance from the deposition membrane and the cathode, said auxiliary membrane having pores with a diameter which is smaller than the average particle diameter of the solid particles present in the suspension, and in that the space between the auxiliary membrane and the cathode is filled with an electrically conducting liquid, and in that the electrodes bringing about the electrophoresis are arranged in such a manner with respect to the suspension that the direction of movement of the suspended particles and the gravitational field acting on the particles extend parallel to each other.

In the electrophoretic deposition of the solid particles, being starting material for a glass body, from an aqueous suspension the problem presents itself that not only the negatively charged solid particles, in particular quartz-glass particles, are deposited at the anode, but also that at voltages in excess of 1 V oxygen is simultaneously released in the deposition process, which also deposits at the anode and is thus incorporated in the growing solid layer, thereby forming pores in the green body produced in this manner, which can only be densely sintered at an increased expenditure (i.e. at temperatures exceeding 1500° C.). This problem can be avoided when, for example, a non-aqueous solution is used. However, for an industrial-scale manufacture of highly pure quartz-glass bodies which are free from bubbles and reams, it is very advantageous when aqueous suspensions can be used. To preclude the inclusion of oxygen in the growing solid layer, the solids content of the suspension is deposited on a porous membrane the pores of which have a diameter which is smaller than the average particle diameter of the solid particles present in the suspension, the deposition membrane being arranged between the anode and the auxiliary membrane, and the space between the deposition membrane and the anode, on the one hand, and between the auxiliary membrane and the cathode, on the other hand, being filled with electrically conducting liquid.

In accordance with advantageous embodiments of the method according to the invention, an aqueous suspension comprising $SiO_2$-particles having a diameter in the range from 10 to 500 nm, preferably 15 to 100 nm, with an average particle diameter of 40 nm, and a solid:-water weight ratio of 1:1 to 1:4 is used as the starting material for the glass body. This has the advantage that green bodies can be obtained having an advantageously high density of 35 to 60%, preferably 50%, of the density of compact quartz glass.

In accordance with another advantageous embodiment of the method according to the invention, a porous deposition membrane and a porous auxiliary membrane are used having pores with a diameter <100 nm, in particular in the range from <10 nm and >0.14 nm. The pore diameter of the deposition membrane is selected in such a manner that the highly disperse solid particles having an average particle diameter of 40 nm are retained on the deposition membrane, while smaller ions, such as OH-ions having a diameter of 0.14 nm, are allowed to pass through the deposition membrane.

Advantageously, a porous synthetic resin foil, as used in, for example, dialysis processes, can be used for both the deposition membrane and the auxiliary membrane.

In accordance with an advantageous embodiment of the method according to the invention, an ionogenic additive is added to the suspension, which moves the pH-value of the suspension towards alkalinity ($pH \leq 10$). This has several advantages: The ionogenic additive first brings about the dispersal of the solid particles (in particular in the ultrasonic field) and enhances the uniform crosslinking of the solid particles in the suspension as regards both the rate of crosslinking and the increase in bonding force among the solid particles.

In this manner, more homogeneous, stabilised suspensions can be attained, which has the advantage that the green body formed from the suspension has a homogeneous pore volume, so that a glass body which is free from bubbles and reams can be obtained at sintering temperatures which are lower than those required for sintering a green body having a very inhomogeneous pore volume into a glass body of comparable quality. Consequently, more economical sintering furnaces can be used: at sintering temperatures upto 1550° C. SiC-lined furnaces can be used, at sintering temperatures above 1550° C. furnaces having a lining which is resistant to very high temperatures, for example of $MoSi_2$, must be used; said furnaces are more expensive than SiC-lined furnaces. A further advantage of a sintering temperature which is as low as possible is that there is an increase of recrystallization effects on the surface of the sintered body according as the sintering temperature is higher, which effects are disturbing and undesired, in particular, when the glass bodies are to be used as preforms for optical waveguides, because the mechanical properties exhibit a substantial deterioration (risk of the formation of cracks).

When, in accordance with yet another advantageous embodiment of the method according to the invention, an ammonium compound is used as the ionogenic additive, the advantage is obtained that the additive is very volatile and can be fully removed from the green body in a subsequent purification-heating step, so that quartz-glass bodies of very high purity can be manufactured. By virtue of the addition of an ammonium compound, green bodies having a relatively great strength are attained because a gel formation takes place at the contact areas of two $SiO_2$ primary particles.

$SiO_2$ is separated at the contact areas and forms a bridging layer.

When a 5% aqueous $NH_4F$-solution is added to the suspension as the ionogenic additive, a fluorine-doping can be attained which is suitable for, for example, the manufacture of cladding glasses for optical waveguides.

In accordance with a further advantageous embodiment of the method according to the invention, the ionogenic additive is added in a quantity of 0.05 to 5 wt.% of the solids content of the suspension. This has the advantage, that the additive which acts as a cross-linking activator is present in a quantity such that just the surface of the solid particles in the suspension is covered with ions of the ionogenic additive. The quantity of the ionogenic additive should not be larger than 5% of the solids content of the suspension, because the viscosity of the suspension is increased substantially, which has a negative effect on the electrophoretic deposition.

The present method enables a laminated body to be advantageously manufactured by successively depositing several layers from differently doped suspensions. For this purpose, the first suspension is removed from the device after a desired layer thickness of the green body has been attained, and the deposition process is continued with a second, for example differently doped, suspension.

Thus, the present method is very suitable for the manufacture of preforms for optical waveguides having a step refractive index profile.

It is alternatively possible to manufacture an optical waveguide having a W-profile by incorporating an intermediate layer having a smaller refractive index which is obtained by using a suitably doped suspension. Dopants which are used to change the refractive index of a glass body are known to those skilled in the art; to increase the refractive index, for example, $GeO_2$ or $Al_2O_3$ are used and to lower the refractive index, for example, $B_2O_3$ or fluorine are used. The present method also enables the manufacture of a quartz-glass body whose refractive index variation is substantially continuous, by depositing a plurality of layers having a graded doping.

A device for carrying out the inventive method as claimed in Claim 1, which device comprises a vessel in which a porous deposition membrane is accommodated whose shape corresponds to that of the green body to be manufactured, and the space between the deposition membrane and an anode arranged at a distance therefrom at the inner wall of the vessel is filled with an electrically conducting liquid, the anode and a cathode arranged at the inner wall of the vessel opposite the inner wall at which the anode is arranged, being electrically interconnected through electrode connections, is characterized in that a porous auxiliary membrane is arranged between the deposition membrane and the cathode, in that the space between the deposition membrane and the auxiliary membrane is intended for holding starting material in the form of a suspension which can be separated into phases, in that the space between the auxiliary membrane and the cathode is filled with electrically conducting liquid, and in that both the deposition membrane and the auxiliary membrane have pores the diameter of which is smaller than the diameter of the solid particles in the suspension.

A device for carrying out the inventive method as claimed in Claim 2, is characterized by a trough at the bottom of which there is arranged an electrode plate, by a cell which is accommodated in the trough at a distance from the electrode plate and which serves to hold a suspension which is to be electrophoretically separated into a solid layer and a liquid phase, the cell being immersed in an electrically conducting liquid which is contained in the trough, said cell being composed of a frame of electrically insulating material forming the side walls of the cell and an ion-permeable membrane forming the bottom plate, an open-pore filter plate of a hydrophilic material which supports the membrane being arranged underneath the membrane, and a wide-meshed counter electrode supported by a frame and a switch which is connected to a voltage source and which is used to open and close the circuit between the electrodes being arranged in the upper part of the cell.

A further device for carrying out the inventive method as claimed in Claim 2, which device is used to deposit tubular green bodies, is characterized by a tube of an electrically insulating material which can be rotated in a horizontal plane and which is closed on the frontside, except for at least one concentrical aperture for deaerating and introducing a suspension which is to be electrophoretically separated into a solid layer and a liquid phase, and in which tube there are concentrically arranged at a distance from each other, viewed from the outside inwards, an electrode cylinder, an open-pore filter tube of a hydrophilic material, an ion-permeable membrane hose and a wide-meshed counter electrode in a frame, the space between the electrode and the membrane being filled with an electrically conducting liquid, and the circuit between the electrodes can be closed through wipers connected to a voltage source.

The invention has the advantage that the electrophoretic deposition of colloidal particles with the use of both a deposition membrane and an auxiliary membrane, i.e. a double membrane, enables the pH-value in the suspension and, hence, the electrophoretic deposition to be influenced in a specific manner. A further advantage consists in that different layer thicknesses of the deposited solid layers, caused by segregation of the suspension, are precluded and larger solids contents can be deposited from a suspension.

BRIEF DESCRIPTION OF THE DRAWINGS

Exemplary embodiments of the invention are described below, in which.

DETAILED DESCRIPTION OF THE PREFERRED EMBODIMENTS

Figure 1:
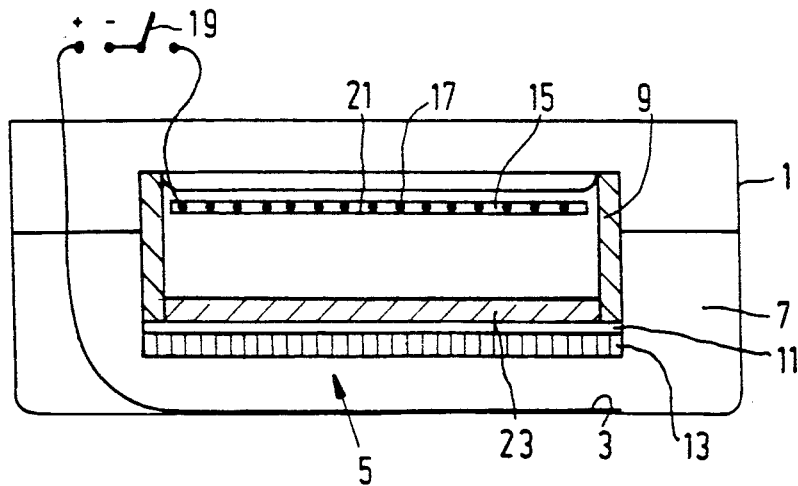
FIGS. 1, 3 are diagrammatic sectional views of devices for depositing plate-shaped green bodies.

The device shown in FIG. 1 is suitable for the deposition of plate-shaped green bodies. A suspension 21 which is to be separated electrophoretically is contained in a cell 5 which is composed of a frame 9 of electrically insulating material, preferably an elastomer such as rubber or silicone rubber, and a bottom plate. Said bottom plate must be permeable to ions but also have the ability to retain dispersed $SiO_2$-particles. Said bottom plate preferably consists of a membrane 11 of regenerated cellulose having a pore size < 100 nm (for example a dialysis membrane having a pore diameter of 10 nm can be suitably used). Said membrane 11 is mechanically supported by an open-pore, hydrophilic filter plate 13. The cell 5 is immersed in an electrically conducting liquid 7 in the trough 1 (the required support is not shown). An electrode plate 3 which preferably consists of platinum sheet and which is connected to a voltage source is situated below the filter plate 13 in the electrically conducting liquid 7.

A counter electrode 17 is positioned near the surface of the suspension 21 and is composed of stretched wires or a wide-meshed net of an electrically conducting material, the wires or the wide-meshed net being held by a frame 15. Also in this case, platinum can very suitably be used as the material for the counter electrode 17. The wires (or the net) or connected to one pole of the voltage source through a switch 19.

The electrophoretic deposition of the dispersed $SiO_2$ particles starts after closing the switch 19. A solid layer 23 having a uniform thickness is deposited on the membrane 11, which layer can be removed from the cell and subjected to further treatments when it has reached the desired thickness.

Also in this arrangement the decomposition voltage of water is clearly exceeded, consequently, oxygen bubbles are formed at the anode and hydrogen bubbles are formed at the cathode. The hydrogen bubbles can pass almost unhindered through the stretched wires or the net of the counter electrode 17 and rise to the surface.

The suspension 21 having a relatively small solids content accumulates at said location, without the quality of the deposited layer 23 being adversely affected. The oxygen bubbles, on the contrary, accumulate below the filter plate 13. Large accumulations of gas bubbles may escape sideways and rise to the surface, but also small accumulations of bubbles do not have an adverse effect on the electrical conductivity in the cell 5 because the open-pore filter plate 13 which is impregnated with the electrolyte liquid 7 exhibits a sufficiently large shunt conductivity, thereby short-circuiting insulating gas bubbles (no closed gas layer is formed).

In a variant of the method, the development of gas bubbles at the anode can be suppressed when an electrolyte is used in the electrically conducting liquid 7, which electrolyte can be oxidized at the electrode instead of the OH-ions. These requirements are met by, for example, additions of $NH_4Br$ and $NH_4J$. The following reaction takes place at the anode:

$$NH_4Br + 6OH^- \rightarrow NH_4BrO_3 + 3H_2O + 6e^{3\mathrm{l}}.$$

When said electrolytes are used in the electrically conducting liquid 7, the filter plate 13 must be impregnated with the same electrolyte solution as that on which the suspension 21 is based. Without this buffer in the filter plate 13, there is a risk that a diffusion of bromide and-/or bromate ions through the filtering membrane 11 causes the colloid-chemical system in the suspension to change.

Ammonium salts can suitably be added to the suspension 21 as ionogenic additives, which salts can be completely removed from the green body after the drying operation. Particularly suitable are $NH_4F$, $NH_4OH$ and tetramethyl ammonium hydroxide (TMAH), which are added in concentrations of 0.05 to 5 wt.% (of the solids content in the suspension).

Suitable concentrations of the $NH_4Br$ or $NH_4J$ solutions range between 0.5 and 50 wt.% (related to water).

In accordance with the method of the invention and using the devices according to the invention, also tubes can be manufactured in the same manner as plates. This only requires the use of a cylindro-symmetrical device as diagrammatically shown in FIG. 2.

Figure 2:
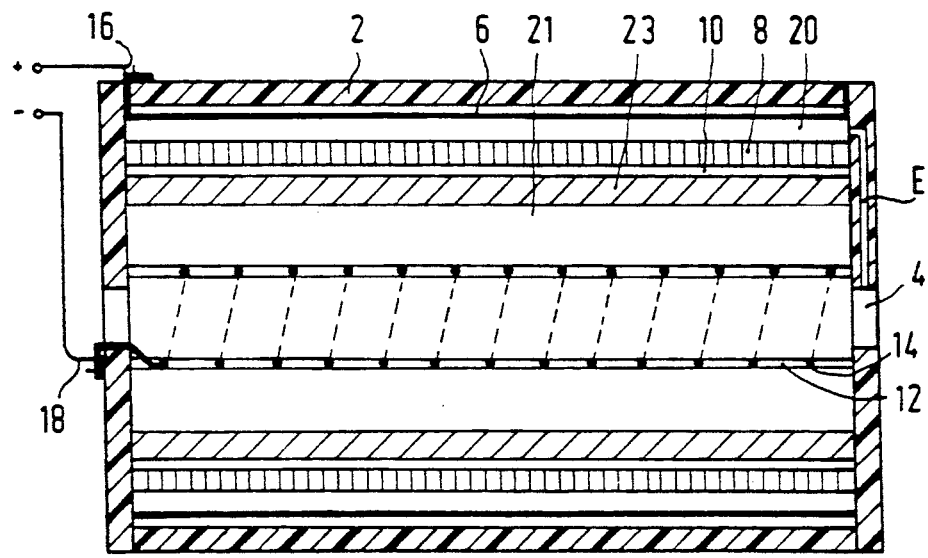
FIG. 2 is a diagrammatic sectional view of a device for depositing tubular green bodies.

A cell which is analogous to cell 5 of FIG. 1 and which comprises a tubular filter 8, a membrane 10, a counter electrode 14 and an electrode cylinder 6 are arranged in a tube 2 which is electrically insulating at its end faces and which comprises a concentrical aperture 4, for introducing suspension 21, at at least one of its end faces. A vent E also opens into said concentric aperture 4. During the deposition operation, the tube 2 rotates about its longitudinal axis at a rate of 100 to 1000 r.p.m., so that during the deposition the solid particles from the suspension 21 travel parallel again to the gravitational field and the suspension 21 is also distributed cylindro-symmetrically. The bearing and the driving mechanism for the tube of FIG. 2 are not shown. Efficaciously, the suspension 21 is injected into the already rotating tube 2 through the aperture 4, the maximum filling level being determined by the aperture 4. To enable a proper release from the mould, the tubular filter 8 is to be composed of at least two portions, so that the deposited solid layer 23 and the membrane hose 10 can be easily removed from the device. Subsequently, the membrane hose 10 is separated from the deposited green body. The electrodes 6 and 14 are brought into contact with each other through wipers 16 and 18 which are connected to a voltage source.

In the following, a description is given of exemplary embodiments of the invention.

EXAMPLE 1

100 g of a highly disperse silica-glass powder having a particle diameter in the range from 10 to 100 nm and an average particle diameter of approximately 40 nm are stirred into a solution consisting of 150 ml of double-distilled water and 15 ml of an aqueous 5% TMAH-solution, and dispersed in an ultrasonic bath for 15 min.

The suspension is subsequently poured through a sieve having a mesh size of 125 um and after the sieving operation, the suspension is introduced into a square cell (cell 5 as shown in FIG. 1) the sides of which have a length of 40 mm and which has a filling level of 20 mm, said cell consisting of a silicone rubber frame 9 having a height of 25 mm and a membrane 11 having pores with a diameter of approximately 3.5 mm. Said membrane 11 is supported by a 5 mm thick filter plate 13 of hydrophilic polyethylene having a pore diameter of approximately 10 um. The cell 5 is introduced into an aqueous 0.45% TMAH-solution contained in a trough 1. An electrode plate 3 of platinum sheet is located 5 mm below the filter plate at the bottom of the trough 1. The counter electrode 17 was manufactured from platinum wire having a diameter of 0.5 mm, the wires forming the counter electrode being stretched on a frame 15 at a mutual distance of approximately 10 mm. The counter electrode 17 thus formed is arranged approximately 2 to 3 mm below the surface of the suspension 21.

A direct voltage of 30 V was applied to the cell 5, the current density being approximately 10 mA/cm$^2$. After 5 min. a uniformly 9 mm thick solid layer 23 was deposited on the membrane 11 which had a mass of 12.8 g after drying, which corresponds to a yield of 80%.

EXAMPLE 2

In the same manner as described with respect to Example 1, a suspension of 100 g of highly dispersed silica-glass powder, 0.75 g of NH$_4$F and 165 ml of double-distilled water was produced and introduced into the cell 5, as described in Example 1. Unlike Example 1, the filter plate 13 was impregnated with an aqueous, 0.45% NH$_4$F-solution, and an aqueous, concentrated NH$_4$J-solution (approximately 100 g of NH$_4$J per 100 ml of water) was introduced between the filter plate 13 and the electrode 3. At a constant current of 500 mA, the potential dropped from 60 to 9 V during the deposition time of 4 min. No formation of gas bubbles at the electrode was observed. The deposited solid layer 23 had a uniform thickness, exhibited no chipping on the side of the filter after drying and had a mass of 2.5 g.

After the deposition of the solid layer 23, the residual suspension which is deplete with solid matter is poured out of the device and the membrane 10, 11 is separated from the deposited solid layer 23. When a membrane hose 10 is used for the deposition of a tubular green body in accordance with FIG. 2, said hose can be removed as narrow, spiral-shaped strips without causing damage to the glossy surface of the deposited solid layer 23.

After slowly drying the green body for 24 hours, the dried green body which has a density of 52% of the density of compact quartz glass is heated to a temperature of 900° C. for 3 hours, and subsequently purified in a flowing oxygen atmosphere to which 6 vol. % of chlorine gas is added for 4 hours. The final sintering operation to obtain a transparent quartz-glass body which is free from bubbles and reams is carried out in a helium atmosphere comprising 2 vol. % of chlorine gas at a temperature of 1500° C., the green body to be sintered being led through the oven at a rate of 3 mm/min. Quartz-glass bodies are obtained having a glossy, structureless surface. The glass thus manufactured had a density of 2.20 g/cm$^3$, a refractive index nD=1.458 and contained <10 ppb of impurities in the form of water and transition metals.

In the electrophoretic deposition process, changes in the effective pH-value influence, as described above, the density of the deposited moulded body as a result of which geometrical changes or cracks may appear in the subsequent treatments, such as drying and sintering, to which the green body is subjected.

Figure 3:
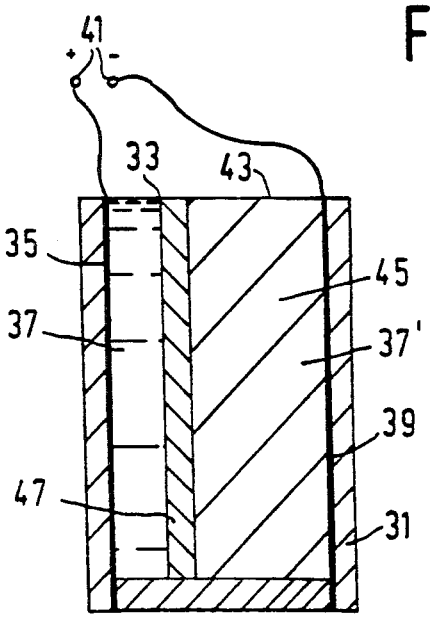

Using the present method and the device as shown in FIG. 3, this problem can be avoided in that a second membrane is arranged as an auxiliary membrane in front of the cathode. This is diagrammatically shown in FIG. 3 by means of an example of a simple electrophoretic deposition cell comprising a vessel 31. A deposition membrane 33 and an auxiliary membrane 43 inside the vessel 31 preferably consist of regenerated cellulose having pores with a diameter ≦0.2 μm. A dialysis membrane having a pore diameter ≦10 μm can be advantageously used. By virtue of the second auxiliary membrane which is arranged in front of the cathode 39, it is precluded that the suspension 45 and the electrically conducting liquid 37' in front of the cathode 39, which conducting liquid takes on a higher pH-value, are mixed by convection streams.

By virtue thereof, even under the above-mentioned, essentially unfavourable conditions, the suspension 45 does not change its pH-value, during the deposition of solid particles, such that a deposited solid-particle layer, which represents the green body, is influenced. Electrically conducting liquid in the form of electrolyte solutions 37, 37' is present in front of, respectively, the electrodes 35, 39; to minimize electro-osmotic effects said electrolyte solutions should exhibit the same addition of electrolytes as the suspension 45. The electrodes 35, 39 should preferably consist of a noble metal, such as platinum sheet. The distance between the electrodes 35, 39 and the membranes 33, 43 is determined by electrically insulating spacers at the bottom of the vessel 31, said spacers consisting of, preferably, an electrically non-conducting elastomer. The spaces between, on the one hand, the cathode 39 and the auxiliary membrane 43 and, on the other hand, the anode 35 and the deposition membrane 33 should be dimensioned such that any gas bubbles formed can rise without problems; a width of said spaces of approximately 3 to 20 mm has proved to be satisfactory. When said spaces are wider, the greater electrical resistance of the cell as a whole causes the voltages required for the electrophoretic deposition of solid particles from the suspension 45 and hence the power cost to rise unnecessarily.

In addition to the planar arrangement, as described with respect to FIG. 3, which can be used for the manufacture of plate-shaped green bodies, a corresponding cylindro-symmetrical arrangement permits the manufacture of tubular green bodies.

When different electrolytes are used for the electrically conducting liquid 37' in the space near the cathode 39 (electrolyte chamber close to the cathode) and for the suspension 45, the pH-value in the suspension 45 can be influenced in a specific manner during the deposition operation. Thus, the pH-value in the suspension 45 rises when tetramethyl ammonium hydroxide (TMAH) is used as the electrolyte for the electrically conducting liquid 37'. Analogously, the pH-value in the suspension 45 drops when hydrofluoric acid is added to the electrically conducting liquid 37' as the electrolyte.

In accordance with FIG. 3, a deposition membrane 33 having a surface area of $40 \times 40$ mm$^2$ is arranged in a vessel 31 for the electrophoretic deposition of planar green bodies in the form of a solid particle layer 47 at a distance of 20 mm from a flat anode 35 which is provided on the inner wall of the vessel 31. A flat auxiliary membrane 43 is arranged at a distance of 20 mm from the deposition membrane 33, which auxiliary membrane is located at a distance of 3 mm from a cathode 39 provided on the inner wall of the vessel 31, which inner wall is situated opposite the anode-carrying inner wall of the vessel 31. In this manner, an anode-near electrolyte chamber for holding electrically conducting liquid 37, a chamber for holding suspension 45, which chamber is arranged between deposition membrane 33 and auxiliary membrane 43, and a cathode-near electrolyte chamber for holding electrically conducting liquid 37' are formed.

EXAMPLE 3

The suspension used for the deposition of the green body is prepared as follows:

100 g of a highly disperse silica-glass powder having a particle diameter in the range from 10 to 100 nm and an average particle diameter of approximately 40 nm were stirred into 165 ml of a 0.1% NH$_4$F-solution and dispersed in an ultrasonic bath for 15 min. The suspension was then poured through a synthetic resin sieve having a mesh size of 125 μm to retain coarse, insufficiently dispersed SiO$_2$-particles. An aqueous, 0.1% NH$_4$F-solution having a pH-value in the range from 5.5 to 5.7 was introduced into the anode-near electrolyte chamber, and an aqueous, 0.1% NH$_4$HF$_2$-solution having a pH-value of 3.0 was introduced into the cathode-near electrolyte chamber.

At an applied direct voltage of 15 V, the current decreased from 140 to 120 mA during a deposition time of 5 min. A uniformly thick, solid particle layer 47 having a dry weight of 1.25 g was deposited on the deposition membrane 33. The pH-value in the suspension 45 did not change to a measurable extent.

In a reference test in which only a deposition membrane was used (i.e. no auxiliary membrane), the other conditions remaining the same, the formation of a solid particle layer having a dry weight of 1.6 g was additionally observed at the cathode. The layer 47 deposited on the deposition membrane 33 had an equal dry weight. During the deposition, the pH-value rose from 5.0 to 9.2.

EXAMPLE 4

The process was conducted as described in Example 3, however, the SiO$_2$-powder was stirred into a 0.45% TMAH-solution. A 0.45% TMAH-solution was introduced into the anode-near and cathode-near electrolyte chambers as the electrically conducting liquid 37, 37'; the pH-value was 12.5. The deposition of a solid particle layer 47 took place at a direct voltage of 30 V, the current rising from 200 mA to 320 mA for 5 min. The deposited dry weight in the layer 47 was 8.88 g. The pH-value of the suspension 45 changed slightly from 10.0 to 11.

EXAMPLE 5

The process was conducted in the same manner as described in Example 3, however, the SiO$_2$-powder was stirred into a 0.75% NH$_4$F-solution. A 0.75% NH$_4$F-solution was poured into the anode-near electrolyte chamber, a 0.75% TMAH-solution with a pH-value of 12.5 was introduced into the cathode-near electrolyte chamber. After 5 min., the pH-value in the suspension 45 rose from 5.9 to 9.2.

EXAMPLE 6

The process was conducted in the same manner as described in Example 5, with this difference that a 0.75% HF-solution with a pH-value of 1.5 was introduced into the cathode-near electrolyte chamber. The pH-value in the suspension decreased from 5.9 to 4.3.

After the deposition of the solid layer 47, the residual suspension which is deplete with solid is poured out of the device and the deposition membrane 33 is separated from the deposited solid layer 47. When a membrane hose is used for the manufacture of tubular green bodies, said hose can be removed in narrow, spiral-shaped strips without causing damage to the glossy surface of the deposited solid layer (green body).

After slowly drying the green body for 24 hours, the dry green body having a density of 52% of the density of compact quartz glass is heated to a temperature of 900° C. in 3 hours and purified in a flowing oxygen atmosphere to which 6 vol. % of chlorine gas is added for 4 hours. The final sintering operation to obtain a transparent quartz-glass body which is free from bubbles and reams is carried out at a temperature of 1500° C. in a helium atmosphere to which 2 vol. % of chlorine gas is added, the green body to be sintered being led through the oven at a rate of 3 mm/min. Quartz-glass bodies having a glossy, structureless surface were obtained. The glass thus produced had a density of 2.20 g/cm$^3$, a refractive index $n_D = 1.458$ and an impurity content < 10 ppb, the impurities being water and transition metals.

I claim:

1. A method of manufacturing glass bodies, in which a porous green body is formed from the starting material for the glass body, which green body is then purified and sintered, the starting material being an aqueous suspension comprising a highly disperse solids content, and deposited by separating the phases of the suspension through electrophoresis, in such a manner that the solids content of the suspension is deposited on a porous deposition membrane having pores whose diameter is smaller than the average particle diameter of the solid particles present in the suspension, said membrane being arranged between the anode and the cathode, and the space between said membrane and the anode being filled with an electrically conducting liquid, characterized in that a porous auxiliary membrane is arranged between and at a distance from the deposition membrane and the cathode, said auxiliary membrane having pores with a diameter which is smaller than the average particle diameter of the solid particles present in the suspension, and in that the space between the auxiliary membrane and the cathode is filled with an electrically conducting liquid.

2. A method as claimed in claim 1, characterized in that water, to which an electrolyte in the form of an ionogenic substance is added, is used as the electrically conducting liquid, said ionogenic substance moving the pH-value of the electrically conducting liquid towards alkalinity (pH $\leq 10$).

3. A method as claimed in claim 2, characterized in that an ammonium compound, in particular a 5% aqueous $NH_4F$-solution, is used as the ionogenic substance.

4. A method as claimed in claim 1, characterized in that the solids content of the suspension is deposited at a current density of 0.1 to 100 $mA/cm^2$ of electrode surface.

5. A method as claimed in claim 1, characterized in that a porous deposition membrane and a porous auxiliary membrane are used having pores with a diameter $<100$ nm, in particular in the range from $<10$ nm to $>0.14$ nm.

6. A method as claimed in claim 5, characterized in that a deposition membrane and an auxiliary membrane of porous synthetic resin foil are used.

7. A method as claimed in claim 1, characterized in that an anode of a nonmetallic, properly electrically conducting material is used.

8. A method as claimed in claim 7, characterized in that an anode of graphite is used.

9. A method as claimed in claim 1, characterized in that an anode of a noble metal is used.

10. A method as claimed in claim 9, characterized in that an anode of platinum is used.

11. A method as claimed in claim 1, characterized in that an aqueous suspension comprising $SiO_2$-particles having a diameter in the range from 10 to 500 nm, preferably 15 to 100 nm, with an average particle diameter of 40 nm, is used as the starting material for the glass body.

12. A method as claimed in claim 11, characterized in that a suspension having a solid-water weight ratio of 1:1 to 1:4 is used.

13. A method as claimed in claim 11, characterized in that an ionogenic additive is added to the suspension, which additive moves the pH-value of the suspension towards alkalinity (pH $\leq 10$).

14. A method as claimed in claim 12, characterized in that an ammonium compound, in particular a 5% aqueous $NH_4F$-solution, is added as the ionogenic additive.

15. A method as claimed in claim 11, characterized in that the ionogenic additive is added in a quantity of 0.05 to 5 wt. % of the solids content in the suspension.

16. A method as claimed in preceding claim 1, characterized in that the electrolyte is added to the electrically conducting liquid in a concentration which corresponds to the concentration of the ionogenic additive in the suspension.

17. A device for carrying out the method as claimed in claims 1, which device comprises a vessel in which a porous deposition membrane is accommodated whose shape corresponds to that of the green body to be manufactured, and the space between the deposition membrane and an anode arranged at a distance therefrom at the inner wall of the vessel is filled with an electrically conducting liquid, the anode and a cathode arranged at the inner wall of the vessel opposite the inner wall at which the anode is arranged, being electrically interconnected through electrode connections, is characterized in that a porous auxiliary membrane is arranged between the deposition membrane and the cathode, in that the space between the deposition membrane and the auxiliary membrane is intended for holding starting material in the form of a suspension which can be separated into phases, in that the space between the auxiliary membrane and the cathode is filled with electrically conducting liquid, and in that both the deposition membrane and the auxiliary membrane have pores the diameter of which is smaller than the diameter of the solid particles in the suspension.

18. A device as claimed in claim 17, characterized in that the deposition membrane and the auxiliary membrane have pores with a diameter $<10$ nm and $>0.14$ nm.

19. A device as claimed in claim 17, characterized in that the deposition membrane and and the auxiliary membrane consist of porous synthetic resin.

20. A device as claimed in claim 17, characterized in that the electrodes consist of noble metal.

21. A device as claimed in claim 20, characterized in that the electrodes consist of platinum.

22. A device as claimed in claim 17, characterized in that the electrodes consist of a nonmetallic, electrically conducting material.

23. A device as claimed in claim 22, characterized in that the electrodes consist of graphite.

* * * * *